(12) United States Patent
Kneib et al.

(10) Patent No.: US 12,335,277 B2
(45) Date of Patent: Jun. 17, 2025

(54) FRAME INVALIDATION IN THE BUS SYSTEM INCLUDING INTRUSION DETECTION SYSTEM

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 264 days.

(21) Appl. No.: 17/656,250

(22) Filed: Mar. 24, 2022

(65) Prior Publication Data

US 2022/0321583 A1 Oct. 6, 2022

(30) Foreign Application Priority Data

Mar. 30, 2021 (DE) ...................... 10 2021 203 230.3

(51) Int. Cl.
*H04L 9/40* (2022.01)
*H04L 12/40* (2006.01)

(52) U.S. Cl.
CPC .... *H04L 63/1416* (2013.01); *H04L 12/40013* (2013.01); *H04L 12/40019* (2013.01); *H04L 63/1425* (2013.01); *H04L 63/1466* (2013.01); *H04L 2012/40215* (2013.01)

(58) Field of Classification Search
CPC .................. H04L 9/002; H04L 12/4015; H04L 12/40032; H04L 63/1483; H04L 67/12; H04L 12/40013; H04L 63/1441; G06N 3/047; G06F 11/349; G06F 12/1408; G06F 21/50; G06F 21/554; G06F 11/076; G06F 21/74
See application file for complete search history.

(56) References Cited

U.S. PATENT DOCUMENTS

| | | | | |
|---|---|---|---|---|
| 10,484,425 | B2 * | 11/2019 | Giannopoulos | H04L 63/1483 |
| 2015/0191151 | A1 * | 7/2015 | Ben Noon | H04L 63/1441 340/426.1 |
| 2016/0342531 | A1 * | 11/2016 | Sharma | G06F 12/1408 |
| 2017/0093659 | A1 * | 3/2017 | Elend | H04L 67/12 |
| 2017/0109309 | A1 * | 4/2017 | van de Burgt | H04L 12/4013 |
| 2017/0126703 | A1 * | 5/2017 | Ujiie | H04L 67/12 |
| 2017/0300444 | A1 * | 10/2017 | Maletsky | H04L 12/40013 |
| 2019/0028500 | A1 * | 1/2019 | Lee | H04L 12/40032 |
| 2019/0044912 | A1 * | 2/2019 | Yang | G06F 21/50 |

(Continued)

Primary Examiner — Dustin Nguyen
(74) Attorney, Agent, or Firm — NORTON ROSE FULBRIGHT US LLP

(57) ABSTRACT

A node device for a bus system, including a transceiver for connecting to a bus of the bus system; a controller connected to the transceiver via a transmit line and via a receive line, the controller and the transceiver designed to transfer data from the controller to the transceiver via the transmit line and transferring data from the transceiver to the controller via the receive line; a processor; and an intrusion detection system; the processor being connected to the transceiver via a controller bypass line and being designed to, via the controller bypass line, intercept an intrusion into the bus system identified by the intrusion detection system, the intrusion detection system being designed to detect an intrusion into the bus system in which a further node of the bus system sends a frame including an identifier assigned to a third node of the bus system to the bus.

16 Claims, 3 Drawing Sheets

(56) References Cited

U.S. PATENT DOCUMENTS

| | | | |
|---|---|---|---|
| 2019/0171813 A1* | 6/2019 | Oberman | H04L 12/40013 |
| 2019/0182267 A1* | 6/2019 | Aher | H04L 67/12 |
| 2019/0379682 A1* | 12/2019 | Overby | H04L 9/002 |
| 2020/0067956 A1* | 2/2020 | Hartkopp | G06F 11/349 |
| 2020/0143053 A1* | 5/2020 | Gutierrez | G06F 21/554 |
| 2020/0145251 A1* | 5/2020 | Hass | G06F 11/076 |
| 2020/0226274 A1* | 7/2020 | Juliato | H04L 12/4015 |
| 2021/0044382 A1* | 2/2021 | Elend | G06F 21/74 |
| 2021/0114606 A1* | 4/2021 | Alvarez | G06N 3/047 |
| 2021/0157388 A1* | 5/2021 | Kulandaivel | H04L 12/40032 |

* cited by examiner

FRAME INVALIDATION IN THE BUS SYSTEM INCLUDING INTRUSION DETECTION SYSTEM

CROSS REFERENCE

The present application claims the benefit under 35 U.S.C. § 119 of German Patent Application No DE 10 2021 203 230.3 filed on Mar. 30, 2021, which is expressly incorporated herein.

BACKGROUND INFORMATION

Bus systems may include a set of one or of multiple lines (the bus), via which multiple nodes (at least two) are connected to one another for the purpose of exchanging data, each node generally including at least one processor. One advantage of bus systems may be seen in the fact that individual lines between two nodes each are avoided. Bus systems are therefore frequently used when a larger number of nodes (according to a bus system protocol) are intended to communicate with one another. A mechatronic technical system may include a plurality of (electronic) control units, which are able to interact via a bus system (or multiple bus systems, for example, with one or with multiple gateways). The functionality of such a technical system is frequently primarily a function of this interaction. For example, even in a non-autonomously driving vehicle, more than a hundred control units (for example, engine control, transmission control, anti-lock braking system/vehicle dynamics control, airbag, body control unit, driver assistance systems, auto alarm systems, etc.) may be interconnected via a bus system. The increasing digitization and automation and interconnection of technical systems may result in increasingly larger bus systems (i.e., including more nodes). The controller area network (CAN), in which control units of a technical system (for example, of a vehicle) are connected via a CAN bus system and are able to communicate with one another according to a CAN protocol, represents a known and standardized serial bus system according to the multi-master principle, in which all control units in the CAN are equal. For example, CAN (now in various versions) and/or CAN-inspired refinements may be used in mechatronic technical systems of all types (for example, in the automobile industry, in automation technology, in elevator systems, in medical technology, in aviation and space technology, in railroad vehicle manufacturing, in ship building, etc.). CAN and/or CAN-inspired refinements (abbreviated as CAN etc.) have been and are developed in such a way that the data transfer via the CAN bus system is preferably independent of external random interferences (for example, in terms of EMV). For example, the CAN bus may be implemented by two twisted wires (CAN_HIGH, CAN_LOW) and a symmetrical signal transfer may thus be achieved. As a result, CAN etc. has proven successful, in particular, in safety-relevant areas (for example, in the vehicle), in which a high degree of data security is paramount. While CAN etc. are relatively simple, robust and rapid, they may on the other hand be susceptible to targeted attacks and/or to manipulations from the outside.

In general, such intrusion into a bus system may include, for example, the sending of a message (also: frame) from an additional and non-provided node of the bus system or from a provided but infiltrated node of the bus system. Such a message may disrupt the communication of the intended nodes of the bus system. False messages may then, in particular, be sent by targeted deception (for example, by specifying an identifier of an intended node), which negatively influence the bus system and the operation of the associated technical system. As part of the increasing digitization (more interfaces) as well as automation and interconnection of technical systems, bus systems, CAN etc., should therefore be safeguarded against intrusion.

Intrusion detection systems (IDS), which are designed for the purpose of detecting an intrusion into the bus system, are already available in the related art. Frequently in such case, physical characteristics of the individual (intended) nodes in the bus system are used in order to identify the source of the sent message. For example, the clock-based intrusion detection system (CIDS) is based on an individual clock skew of the respective processor of every node. Alternatively or in addition, individual voltage characteristics of the nodes may be analyzed and identified. One further possibility (for example, TCAN, TIDAL-CAN, etc.) is to ascertain a position of the sending node in the bus system and to identify the node by comparing it with the conventional topology/architecture/design of the bus system, if necessary, as a non-intended and thus intruding node. One class of intrusion detection systems is implemented by a majority/plurality of intrusion detection (sub)systems, namely, one each per node of the bus system, an intrusion detection (sub)system of each node being designed for the purpose of identifying misuse of inherent identifiers (i.e. of the respective node). If each node of the bus system includes such an intrusion identification (sub)system, it is possible to detect an intrusion into the bus system from at least one node.

If an intrusion is identified by the intrusion detection system, it may, for example, be logged in a node for documentation and later analysis. Alternatively or in addition, a user (for example, the driver) of the technical system (for example, of the vehicle) may be informed via a user interface or via another service point. In addition or alternatively to these passive responses, an active and preferably direct response may be desirable, in particular, in order to prevent a manipulation of the bus system and/or of the associated technical system. For this purpose, an error message (also: error frame) may be sent to the bus and thus to all nodes of the bus system.

Specific embodiments of a device and of a method are described in U.S. Pat. No. 10,361,934 B2. A CAN device includes a comparison module, which is configured in such a way that it may be connected to a CAN transceiver, the comparison module including a receive data (RXD, receive data) interface, which is configured to receive data from the CAN transceiver; a CAN decoder, which is configured in such a way that it decodes an identifier of a CAN message received by the RXD interface; and an identifier memory, which is configured in such a way that it stores an entry that corresponds to at least one identifier; and a comparison logic, which is configured to compare a received identifier from a CAN message with the entry that is stored in the identifier memory, and to output a match signal if the comparison shows that the received identifier of the CAN message matches the entry that is stored in the CAN device. The CAN device also includes a signal generator, which is configured in such a way that it outputs a signal for invalidating the CAN message in response to the match signal.

SUMMARY

One first general aspect of the present invention relates to a node device for a bus system, including a transceiver, which is designed for the purpose of being connected to a bus of the bus system. The node device further includes a controller, which is connected via a transmit line and via a receive line to the transceiver, the controller and the transceiver being designed for the purpose of transferring data from the controller to the receiver via the transmit line and for transferring data from the transceiver to the controller via the receive line. The node device further includes a processor. The node device further includes an intrusion detection system. The processor is connected to the transceiver via at least one controller bypass line and is designed for the purpose of intercepting, via the at least one controller bypass line, an intrusion into the bus system detected by the intrusion detection system. The intrusion detection system is designed for the purpose of detecting an intrusion into the bus system, in which a further node of the bus system sends a frame with an identifier assigned to a third node of the bus system to the bus, the third node of the bus system being situated outside the node device.

One second general aspect of the present description relates to a bus system including a bus and at least one node device according to the first general aspect (or according to one specific embodiment thereof), which is connected via the transceiver of the at least one node device to the bus. The bus system further includes at least one further node of the bus system, each further node of the bus system including a further transceiver, a further controller and a further processor. The bus system may optionally include at least one further node as a third node of the bus system.

One third general aspect of the present description relates to a computer-implemented method for intercepting an intrusion into the bus system according to the second general aspect, including detecting, via the intrusion detection system (IDS) of the at least one node device, a frame, which is sent from a further node of the bus system to the bus of the bus system, as an intrusion into the bus system. The method further includes sending data of the processor of the at least one node device via the at least one controller bypass line in order to manipulate a signal that corresponds to the frame arriving via the bus. The signal may be manipulated in such a way that each of a number of recessive bits arriving via the bus is overwritten in each case with a dominant bit and/or a level on the transmit line and/or on the receive line over a period of time is set to a particular level. In this way, a sequence of directly consecutive dominant bits may be generated, which according to a bus system protocol, prompts at least one controller of a node of the bus system to send an error frame to the bus, as a result of which the transfer of the frame identified as an intrusion is invalidated and, in particular, prevented and the intrusion into the bus system is thus intercepted.

One advantage of the node device according to the first aspect (or of one specific embodiment thereof) of the present invention may be seen in the fact that the at least one controller bypass line (and, for example, the general purpose input output port (GIPO) of the processor) represents only a small and cost-efficient hardware change as compared to a node device of a conventional bus system, in particular, if the intrusion detection system (IDS) is implemented in the processor of the at least one node device. Using the at least one controller bypass line, it is possible to bypass the processor. In fact, no additional comparison module is then required, for example. Furthermore, the controller of the node device and the bus system protocol of the conventional bus system, in particular, need not be adapted. This is advantageous since bus systems and their bus system protocol (for example, CAN protocol) are frequently standardized and not arbitrarily often/rapidly changed. In addition, the at least one controller bypass line is generally not used (i.e., without intrusion) and thus the functionality of the bus system is generally not changed.

It is further particularly advantageous that it is sufficient for the computer-implemented method according to the third aspect (or to a specific embodiment thereof) of the present invention for intercepting an intrusion into the bus system according to the second general aspect (and, in particular, via the intrusion detection system (IDS)) to expand the at least one node of the bus system only by the at least one controller bypass line. In other words, an existing bus system may already be adapted by a corresponding adaptation of a single node or already by the inclusion of a node according to the first general aspect (or to a specific embodiment thereof) to a bus system according to the second general aspect. As a result, it is possible to intercept already an intrusion into the entire bus system according to the method according to the third general aspect (or to a specific embodiment thereof). This enables a simple and cost-efficient integration into already existing bus systems.

The interception of the instruction, in particular, of the frame of the intruding node, is not tied to the bus system protocol due to the at least one controller bypass line. As a result, an intruding frame may thus be very rapidly intercepted already before an end of frame field (also: invalidated). This may prevent, in particular, in a timely manner, the operation of the technical system (for example, the vehicle) from being impaired and/or damaged.

The sending of an error frame associated with the interception, for example, to the other nodes in the bus system, also results from the present bus system protocol.

The processor of the at least one node device may include the intrusion detection system (IDS). As a result, further separate processors for the intrusion detection system (IDS) may be omitted and costs may be reduced.

One specific embodiment of the at least one node device of the present invention, in which the at least one controller bypass line includes a shared line section with the receive line and no further controller bypass line includes a shared line section with the transmit line, may be assessed as particularly secure insofar as it is not possible to write directly (but only via the controller) to the bus of the bus system. Thus, a manipulation, for example, at a constantly high level via the bypass, would not be possible.

DETAILED DESCRIPTION OF EXAMPLE EMBODIMENT

Figure 1A:
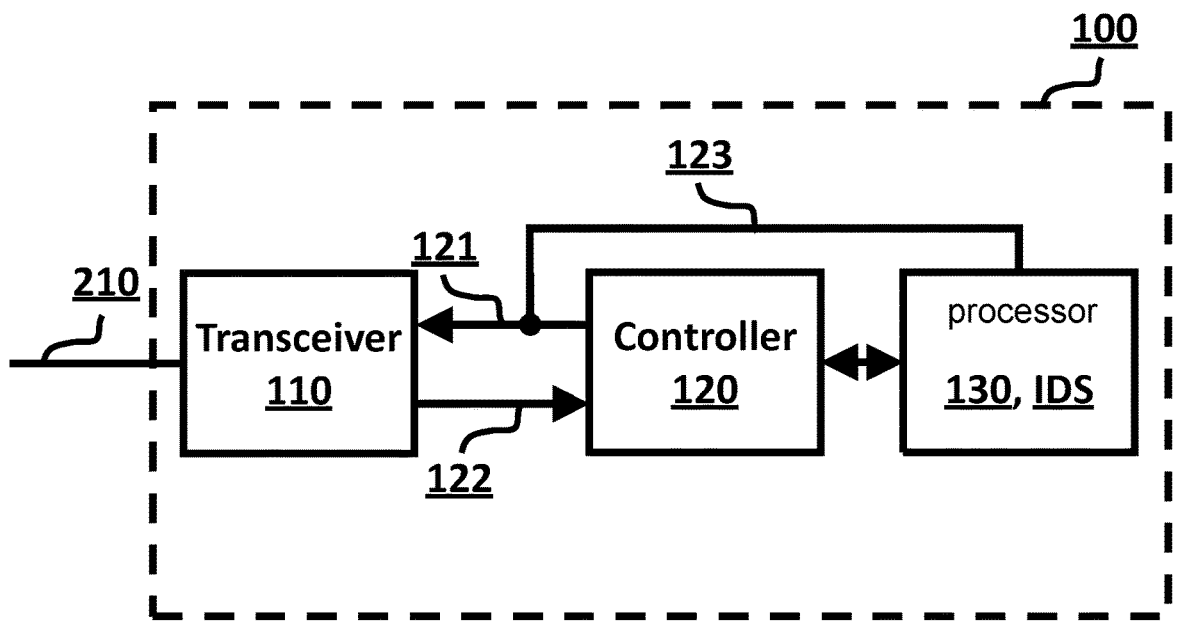
FIG. 1A shows one specific embodiment of a node device for a bus system including a controller bypass line to the transmit line, in accordance with the present invention.

Node device 100, bus system 200 and computer-implemented method 300 are aimed at detecting and intercepting an intrusion into bus system 200. The bus systems of the present invention may be used in numerous mechatronic technical systems and in different fields (for example, in the systems or applications, for example, in a vehicle, listed in the section regarding the related art). A secure interaction between nodes of such a bus system is frequently decisive for the (intended, specified) functionality of the technical system. Even in a non-autonomously driving vehicle, for example, more than a hundred control units (for example, engine control, transmission control, anti-lock braking system/vehicle dynamics control, airbag, body control unit, driver assistance systems, auto alarm systems, etc.) may be interconnected via a bus system. If, for example, a control unit which, for example, has been infiltrated via a multimedia interface, successfully sends false signals (for example, intentionally excessively short distances to a preceding further road user) via the bus system to the further control units, an unintended and even damaging system response could be triggered (for example, initiating an emergency braking application by an adaptive cruise control). The increasing digitization and automation and interconnection of technical systems may result in increasingly larger bus systems (i.e., including more nodes). Intrusion detection systems (IDS) as described in the related art, may detect an intrusion into the bus system and may be used in the systems of the present description.

A node device 100 for a bus system 200 is described, including a transceiver 110, which is designed for the purpose of being connected to a bus 210 of bus system 200. Node device 100 further includes a controller 120 (also: control unit), which is connected to the transceiver via a transmit line 121 and via a receive line 122, the controller and the transceiver being designed for the purpose of transferring data from the controller to the transceiver via the transmit line and transferring data from the transceiver to the controller via the receive line. The node device 100 further includes a processor 130, which may be coupled to the controller. Node device 100 further includes an intrusion detection system (IDS) (for example, one or multiple of the intrusion detection systems that have been described in the section regarding the related art). Processor 130 is connected (for example, via a general purpose input output port, GIPO port, all-purpose input channel/all-purpose output channel) to transceiver 110 via at least one controller bypass line 123, 124 and is designed for the purpose of intercepting, via the at least one controller bypass line 123, 124, an intrusion detected by the intrusion detection system (IDS) into bus system 200. The intrusion detection system (IDS) is designed for the purpose of detecting an intrusion into bus system 200, in which a further node 140 of bus system 200 sends a frame including an identifier assigned to a third node 141 of bus system 200 to bus 210, third node 141 of bus system 200 being situated outside node device 100 (i.e. does not correspond to the node of node device 100). Processor 130 is connected, in particular, by the at least one controller bypass line 123, 124 to transceiver 110 (i.e., via transmit line 121 and/or via receive line 122), controller bypass line 123, 124 bypassing controller 120. The advantage of the at least one controller bypass line 123, 124 may be seen in the fact that in the event of a detected intrusion, data (for example, a signal that corresponds to a frame arriving via bus 210, and/or a signal that corresponds to a frame to be sent to bus 210) between transceiver 110 and controller 120 (i.e. on transmit line 121 and/or on receive line 122) may be changed by processor 130 at any point in time. As is described below, an intruding message (also: frame) may be quickly intercepted as a result, in particular, already before the end of frame field of the intruding message (and, for example, after an arbitration), because, due to the at least one controller bypass line 123, 124, the bus system protocol, in particular, may also be bypassed. In this way, it is possible to intercept potential damage and/or manipulation intended by the intruding message before it is able to occur. Processor 130 may include the controller in part or completely, i.e., the controller may be a logical subunit of processor 130. Due to the at least one controller bypass line 123, 124, the part of processor 130 outside the logical subunit is then connected to transceiver 110. Processor 130 may further include, wholly or in part, the intrusion detection system (IDS). For example, the intrusion detection system (IDS) may be implemented on processor 130, one or multiple parts (for example, a repeater) of the intrusion detection system (IDS) also being capable of being situated outside processor 130 (for example, in bus 210).

The intrusion detection system (IDS) may (additionally) be designed for the purpose of detecting an intrusion into bus system 200, in which a further node 140 of bus system 200 sends a frame including an identifier assigned to a third node 141 of bus system 200 to bus 210, third node 141 of bus system 200 corresponding to the node of node device 100. In other words, intrusion detection system (IDS) may also be designed for the purpose of detecting the misuse of inherent identifiers.

Bus system 200 may, for example, be a controller area network, i.e, a CAN (system) (now in various versions), and/or a CAN-inspired refinement. In this case, bus 210 may be referred to as CAN bus, transceiver 110 as CAN transceiver and controller 120 as CAN controller. The bus system protocol in this case may be a CAN protocol, for example, according to ISO 11898-1 or ISO/DIS 11898-1 (for example, protocols CAN, CAN FD, CAN FEFF, CAN FBFF, etc.). The data may, for example, correspond to serial bits as in the CAN system. Alternatively, bus system 200 may, for example, be a local interconnect network (LIN). Alternatively bus system 200 may, for example, be a FLEXRAY network. Processor 130 may, for example, be a computer, a central processing unit (CPU) or a microprocessor. A node may represent, in particular, a control unit (or a part thereof) in a technical system (for example, in a vehicle).

Figure 2A:
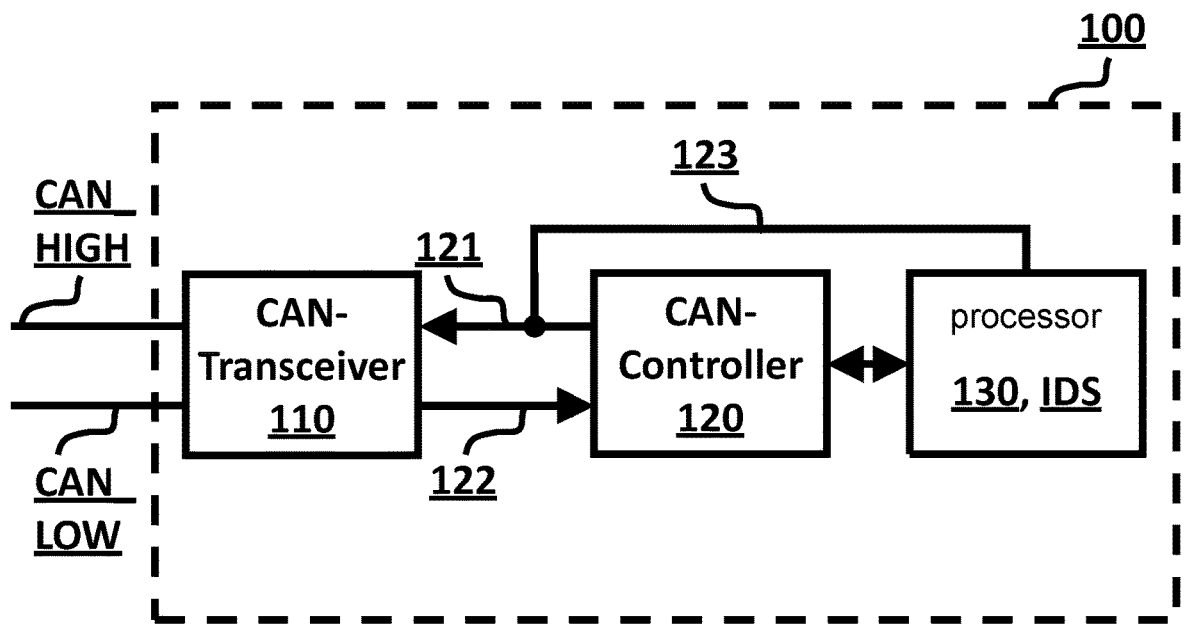
FIG. 2A shows one specific embodiment of a node device for a controller area network (CAN) including a controller bypass line to the transmit line, in accordance with the present invention.

In one specific embodiment (also: specific embodiment Tx), transmit line 121 and the at least one controller bypass line 123 may include a shared line section. In other words, processor 130 here may be connected to transmit line 121, controller 120 being bypassed. Such an exemplary specific embodiment is represented in FIG. 1A and, specifically for a CAN etc., in FIG. 2A.

Figure 1B:
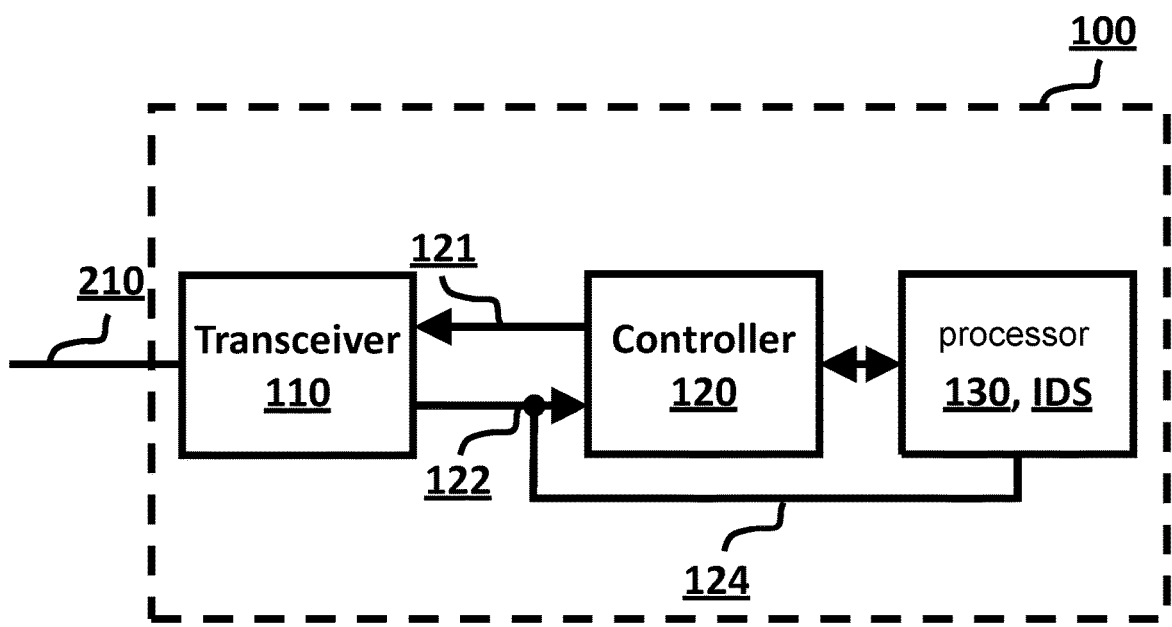
FIG. 1B shows one specific embodiment of a node device for a bus system including a controller bypass line to the receive line, in accordance with the present invention.
Figure 2B:
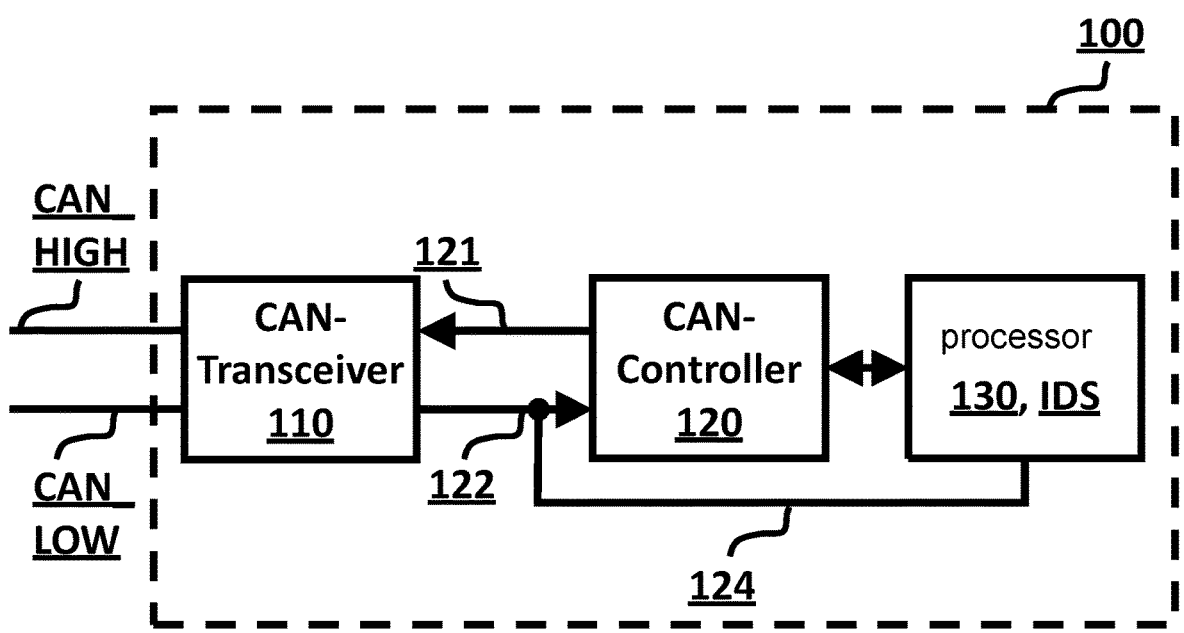
FIG. 2B shows one specific embodiment of a node device for a CAN including a controller bypass line to the receive line, in accordance with the present invention.

In one further specific embodiment (also: specific embodiment Rx) receive line 122 and the at least one controller bypass line 124 may include a shared line section. In other words, processor 130 here may be connected to receive line 122, controller 120 being bypassed. Such an exemplary specific embodiment is represented in FIG. 1B and, specifically for a CAN etc., in FIG. 2B. Alternatively, a second controller bypass line 124 may also be present which, together with receive line 122, includes a shared line section. The at least one controller bypass line 123 may then, for example, include a shared line section with transmit line 121. The intrusion detection system (IDS) may, in contrast to that shown in FIGS. 1A through 2B, also be situated completely or partially outside processor 130.

Figure 3:
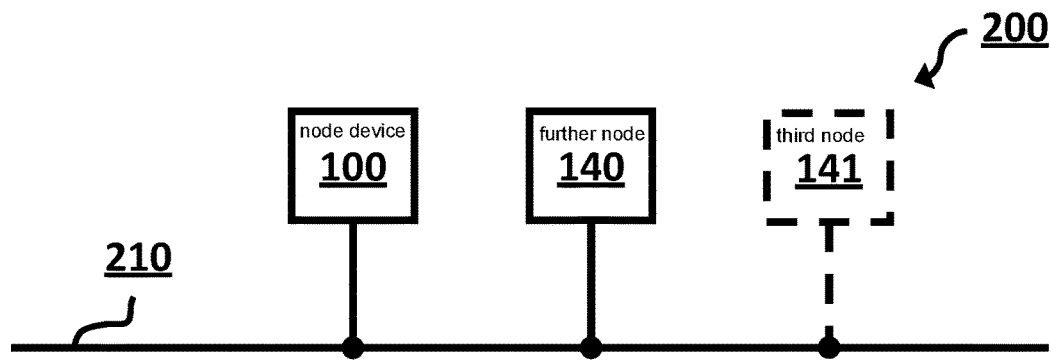
FIG. 3 shows a bus system, in accordance with an example embodiment of the present invention.
Figure 4:
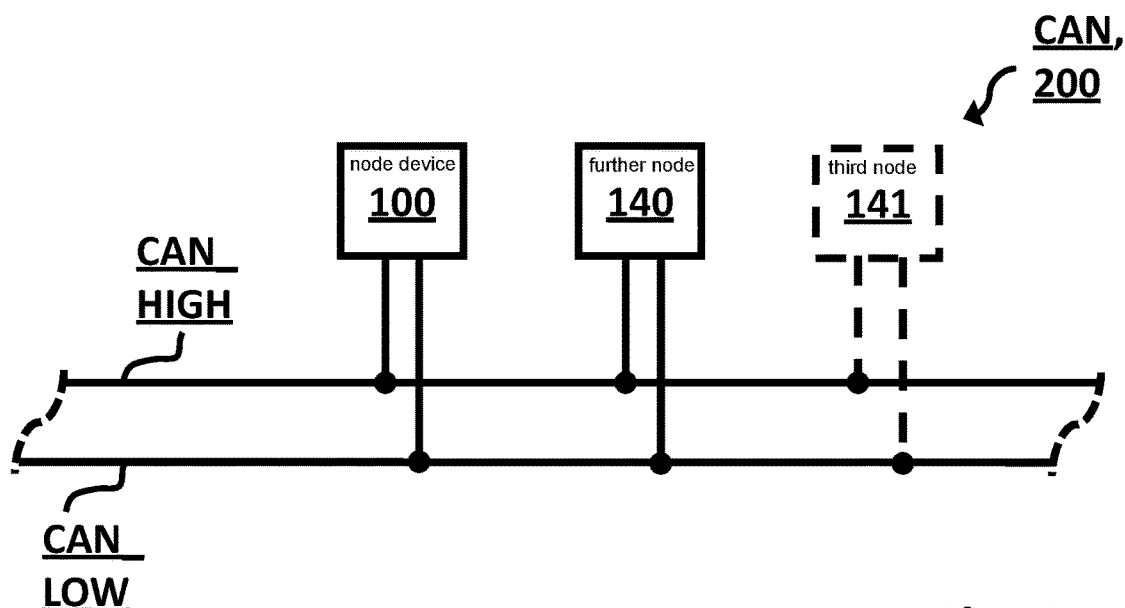
FIG. 4 shows a CAN, in accordance with an example embodiment of the present invention.

A bus system 200 is also described, including a bus 210 and at least one node device 100, which is connected via transceiver 110 of the at least one node device 100 to bus 210. Bus system 200 further includes at least one further node 140 of bus system 200, each further node of bus system 200 being capable of including a further transceiver, a further controller and a further processor. Optionally, bus system 200 may further include at least one further node as third node 141 of bus system 200. One exemplary specific embodiment of bus system 200 is represented in FIG. 3 and, specifically for a CAN etc., in FIG. 4. The at least one node device 100 may, for example, represent precisely the node of a present bus system, which is changed or added in order to be able to detect and to intercept an intrusion into the present bus system. In the case of a CAN etc., the two twisted wires (CAN_HIGH, CAN_LOW) of the CAN bus, in particular for the symmetrical signal transfer, are represented in FIG. 4. In contrast, bus 210 in FIG. 3 may (regardless of the representation) include a set of one or of multiple lines. For example, further node 140 may send a message including an identifier of the node implemented by the at least one node device 100 to bus 210. Alternatively, further node 140 may, for example, send a message including an identifier of (optional) third node 141 to bus 210. Such an intrusion may be intercepted in both cases by the at least one node device 100 and by method 300 described below.

A computer-implemented method 300 for intercepting an intrusion into bus system 200 is also described, including detecting 310, via the intrusion detection system (IDS) (of the at least one node device 100), a frame (also: a message), which is sent from a further node 140 of bus system 200 to bus 210 of bus system 200, as an intrusion into bus system 200. A tapping of bus system 200 (also without a dedicated node device for the bus system), in particular, of bus 210 may also be considered to be a further node 140. Method 300 further includes sending 320 data of processor 130 to the at least one node device 100 via the at least one controller bypass line 123, 124, in order to manipulate a signal corresponding to the frame arriving via bus 210 (in order to intercept the intrusion, i.e., the manipulation from the outside).

In general, a manipulation may include a feeding of a particular data sequence and/or of a particular level (for example, of a particular level for a particular time period) on transmit line 121 and/or on receive line 122.

The signal that corresponds to the frame arriving via bus 210 may include a frame—i.e., for example, a bit sequence—, according to the bus system protocol, further bits not belonging to the frame being capable, for example, of being inserted into the bit sequence. In the case of a bit sequence, a manipulation of the signal may include the change (tipping) of at least one bit of the bit sequence. A signal may be transformed into a bit sequence.

Figure 5:
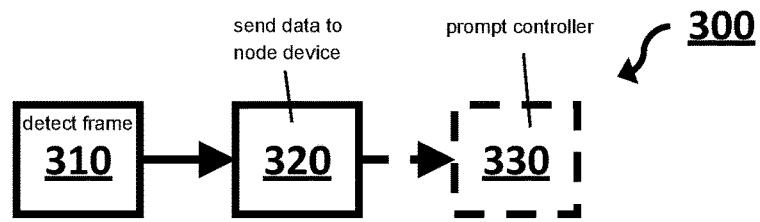
FIG. 5 schematically illustrates a computer-implemented method for intercepting an intrusion into a bus system, in accordance with an example embodiment of the present invention.

The signal may be manipulated in such a way that each of a number of recessive bits arriving via the bus is overwritten in each case with one dominant bit. The arriving recessive bits may arrive temporally in succession, but do not have to arrive temporally directly in succession, since dominant bits may certainly arrive between the recessive bits. In addition or alternatively, the manipulation of the signals may involve setting transmit line 121 and/or receive line 122 over a period of time to a dominant level (for example, the dominant level in this period of time corresponding to a sequence made up of one or of multiple dominant bits). In this case, both the recessive bits as well as the dominant bits may be overwritten with one dominant bit each. A check whether arriving bits are dominant or recessive may be dispensed with here. Method 300 is schematically represented in FIG. 5.

In this figure, a sequence of directly consecutive dominant bits may be generated which, according to one bus system protocol (for example, CAN protocol), prompts 330 at least one controller of a node of bus system 200 to send an error frame to the bus, as a result of which the transfer of the frame detected as an intrusion is invalidated and, in particular, prevented, and thus the intrusion into bus system 200 is intercepted. In other words, in contrast to methods available in the related art, the sending of the error frame does not have to be actively controlled, since it results automatically from the bus system protocol. For example, a level change must occur in a CAN protocol after five equivalent bits (for example, stuffing regulation). Otherwise, an error frame is necessarily output. Due to the at least one controller bypass line 123, 124, it is possible to generate the sequence of directly consecutive dominant bits regardless of the controller and the bus system protocol and thus rapidly. In this way, an intruding frame may be intercepted/invalidated rapidly and, in particular, already before the end of frame field of the intruding frame (and, for example, after an arbitration). Otherwise, i.e., if the bus system protocol were not bypassed, an error frame could be sent to the bus at the earliest at the end of frame field and thus only after an almost complete transfer of the intruding frame (an end of frame field is usually rather at the end of the frame), in order to inform the other nodes. The earlier an intruding frame is able to be detected and prevented, the sooner the further nodes of bus system 200, considering the (non-zero) signal propagation times on bus 210, are able to be informed and protected from damage.

In one previously described specific embodiment Tx of the at least one node device 100, the sequence of directly consecutive dominant bits may be sent by transceiver 110 of the at least one node device 100 to bus 210 of bus system 200. In fact, transceiver 110 is not designed/intended for the purpose of stopping the transfer to bus 210. The at least one controller of the node of bus system 200, which is prompted 330 to send an error frame to the bus, may be a further controller of further node 140, from which the frame detected as an intrusion (i.e., the intruding frame) is sent, the further controller of further node 140 according to the bus system protocol aborting the transfer of the frame before it sends the error frame (also according to the bus system protocol) to bus 210 of bus system 200. The error frame may, for example, be made up of dominant and/or of recessive bits and may be a function of the state of the internal error counter. Alternatively or in addition, the at least one controller of the node of bus system 200, which is prompted 330 to send an error frame to the bus, may be controller 120 of the at least one node device 100 (via transceiver 110 and receive line 122) or a further controller of a further node of bus system 200. In this case, the sequence of directly consecutive dominant bits in the at least one controller may produce a negative result of the cyclic redundancy check (CRC), and the at least one controller according to the bus system protocol may be prompted 330 to send a/the error frame to bus 210.

In one previously described specific embodiment Rx of the at least one node device 100, the sequence of directly consecutive dominant bits may be sent to controller 120 of the at least one node device 100. The at least one controller of the node of bus system 200, which is prompted 330 to send an error frame to the bus, may be controller 120 of the at least one node device 100. In this case, the sequence of directly consecutive dominant bits in the at least one controller may lead to a negative result of the cyclic redundancy check (CRC) and, as a result, the at least one controller according to the bus system protocol may be prompted 330 to send the error frame to the bus. Specific embodiment Rx (without specific embodiment Tx), in which the at least one controller bypass line 124 includes a shared line section with receive line 122 and no further controller bypass line 123 includes a shared line section with transmit line 121, may be assessed in this regard as particularly secure, may be written as not direct (but only via controller 120) to bus 210 of bus system 200. A manipulation at a, for example, constantly high level via the bypass would thus be impossible in contrast to specific embodiment Tx. As a result, it is not possible, for example, to block or immobilize bus 210 via the at least one controller bypass line 124.

The frame detected as an intrusion may (but need not) be invalidated before an end of frame field of the frame. For example, a frame detected as an intrusion may be invalidated after the arbitration and after the transfer of an identifier. This may prevent damage and/or manipulation before it is able to occur.

In node device 100 and/or in bus system 200, method 300 may be implemented in processor 130 of the at least one node device 100 and an intrusion into bus system 200 may thus be intercepted by at least one node device 100. It is sufficient, in particular, if method 300 is implemented and applied in (only) one node of bus system 200. Method 300 may represent a computer program, which may be/is stored (for example, as a signal sequence) on a memory medium.

Node device 100, bus system 200 and method 300 for intercepting an intrusion into bus system 200 presented in this description may relate to a controller area network (CAN), to a local interconnect network (LIN) or to a FLEXRAY network, the controller area network, in particular, being able to include a CAN (system) in one of the various versions, and/or a CAN-inspired refinement. Method 300 for intercepting an intrusion into bus system 200 may be generalized to multi-bus systems, a multi-bus system including at least two bus systems, the bus systems being coupled to one another via at least one gateway. From the perspective of one each of such bus systems, the at least one gateway may be viewed as a node (for example, including multiple receive lines and transmit lines, optionally including multiple controller bypass lines). Method 300 may, for example, be implemented in each gateway of the multi-bus system.

What is claimed is:

1. A node device for a bus system, comprising:
a transceiver configured to be connected to a bus of the bus system;
a controller, which is connected to the transceiver via a transmit line and via a receive line, the controller and the transceiver being configured to transfer data from the controller to the receiver via the transmit line and to transfer data from the transceiver to the controller via the receive line;
a processor,
an intrusion detection system;
wherein the processor is connected via at least one controller bypass line to the transceiver, and is configured to intercept, via the at least one controller bypass line, an intrusion into the bus system detected by the intrusion detection system, the intrusion detection system being configured to detect an intrusion into the bus system, in which a further node of the bus system sends a frame including an identifier assigned to a third node of the bus system to the bus, the third node of the bus system being situated outside the node device, wherein the controller is disposed between the transceiver and the processor, and wherein the controller bypass line is connected to the transceiver and the processor and is not connected to the controller such that a transmission over the controller bypass line is transmitted directly between the transceiver and the processor without being received in or transmitted by the controller.

2. The node device as recited in claim 1, wherein the transmit line and the at least one controller bypass line include a shared line section.

3. The node device as recited in claim 1, wherein the receive line and the at least one controller bypass line include a shared line section.

4. A bus system, comprising:
a bus;
at least one node device, which is connected to the bus via the transceiver of the at least one node device, each of the at least at node device including:
a transceiver configured to be connected to a bus of the bus system,
a controller, which is connected to the transceiver via a transmit line and via a receive line, the controller and the transceiver being configured to transfer data from the controller to the receiver via the transmit line and to transfer data from the transceiver to the controller via the receive line,
a processor,
an intrusion detection system,
wherein the processor is connected via at least one controller bypass line to the transceiver, and is configured to intercept, via the at least one controller bypass line, an intrusion into the bus system detected by the intrusion detection system, the intrusion detection system being configured to detect an intrusion into the bus system, in which a further node of the bus system sends a frame including an identifier assigned to a third node of the bus system to the bus, the third node of the bus system being situated outside the node device; and
the at least one further node of the bus system, each of the at least one further node of the bus system including a further transceiver, a further and a further processor, wherein the controller is disposed between the transceiver and the processor, and wherein the controller bypass line is connected to the transceiver and the processor and is not connected to the controller such that a transmission over the controller bypass line is transmitted directly between the transceiver and the processor without being received in or transmitted by the controller.

5. The bus system as recited in claim 4, wherein further comprising the third node of the bus system.

6. A computer-implemented method for intercepting an intrusion into the bus system, the bus system including:
a bus,
at least one node device, which is connected to the bus via the transceiver of the at least one node device, each of the at least at node device including:
a transceiver configured to be connected to a bus of the bus system,
a controller, which is connected to the transceiver via a transmit line and via a receive line, the controller and the transceiver being configured to transfer data from the controller to the receiver via the transmit line and to transfer data from the transceiver to the controller via the receive line, a processor, an intrusion detection system, wherein the processor is connected via at least one controller bypass line to the transceiver, and is configured to intercept, via the at least one controller bypass line, an intrusion into the bus system detected by the intrusion detection system, the intrusion detection system being configured to detect an intrusion into the bus system, in which a further node of the bus system sends a frame including an identifier assigned to a third node of the bus system to the bus, the third node of the bus system being situated outside the node device; and the at least one further node of the bus system, each of the at least one further node of the bus system including a further transceiver, a further controller and a further processor, wherein the method comprises:

detecting, via the intrusion detection system of the at least one node device, the frame, which is sent from the further node of the bus system to the bus of the bus system, as an intrusion into the bus system; and sending data of the processor of the at least one node device via the at least one controller bypass line, in order to manipulate a signal that corresponds to the frame arriving via the bus, wherein the controller is disposed between the transceiver and the processor, and wherein the controller bypass line is connected to the transceiver and the processor and is not connected to the controller such that a transmission over the controller bypass line is transmitted directly between the transceiver and the processor without being received in or transmitted by the controller.

7. The computer-implemented method as recited in claim 6, wherein the signal is manipulated in such a way that: (i) each of a number of recessive bits arriving via the bus is overwritten in each case with one dominant bit and/or (ii) a level on the transmit line and/or on the receive line over a period of time is set to a particular level, which according to a bus system protocol prompt at least one controller of a node of the bus system to send a frame to the bus, as a result of which a transfer of the frame detected as an intrusion is invalidated and prevented, and the intrusion into the bus system is thus intercepted.

8. The computer-implemented method as recited in claim 7, the setting of the level including generating a sequence of directly consecutive dominant bits.

9. The computer-implemented method as recited in claim 8, wherein the transmit line and the at least one controller bypass line include a shared line section, and wherein the sequence of directly consecutive dominant bits is sent by the transceiver of the at least one node device to the bus of the bus system.

10. The computer-implemented method as recited in claim 9, wherein the at least one controller of the node of the bus system is a further controller of the further node, from which the frame detected as an intrusion is sent, the further controller of the further node according to the bus system protocol aborting the transfer of the frame before it sends an error frame to the bus of the bus system.

11. The computer-implemented method as recited in claim 9, wherein the at least one controller of the node of the bus system is the controller of the at least one node device or a further controller of a further node of the bus system, the sequence of directly consecutive dominant bits in the at least one controller leading to a negative result of the cyclic redundancy check, and, as a result, the at least one controller according to the bus system protocol being prompted to send an error frame to the bus.

12. The computer-implemented method as recited in claim 8, wherein the receive line and the at least one controller bypass line include a shared line section, and wherein the sequence of directly consecutive dominant bits is sent to the controller of the at least one node device.

13. The computer-implemented method as recited in claim 8, wherein the receive line and the at least one controller bypass line include a shared line section, and wherein the at least one controller of the node of the bus system is the controller of the at least one node device, the sequence of directly consecutive dominant bits in the at least one controller leading to a negative result of a cyclic redundancy check, and, as a result, the at least one controller according to the bus system protocol being prompted to send an error frame to the bus.

14. The computer-implemented method as recited in claim 6, wherein the frame detected as an intrusion is invalidated before an end of frame field of the frame.

15. A node device, comprising:

a transceiver configured to be connected to a bus of a bus system;

a controller, which is connected to the transceiver via a transmit line and via a receive line, the controller and the transceiver being configured to transfer data from the controller to the receiver via the transmit line and to transfer data from the transceiver to the controller via the receive line;

a processor;

an intrusion detection system;

wherein the processor is connected via at least one controller bypass line to the transceiver, and is configured to intercept, via the at least one controller bypass line, an intrusion into the bus system detected by the intrusion detection system, the intrusion detection system being configured to detect an intrusion into the bus system, in which a further node of the bus system sends a frame including an identifier assigned to a third node of the bus system to the bus, the third node of the bus system being situated outside the node device;

wherein the processor is configured to:

detect, via the intrusion detection system of the at least one node device, the frame, which is sent from the further node of the bus system to the bus of the bus system, as an intrusion into the bus system; and send data of the processor of the at least one node device via the at least one controller bypass line, in order to manipulate a signal that corresponds to the frame arriving via the bus, wherein the controller is disposed between the transceiver and the processor, and wherein the controller bypass line is connected to the transceiver and the processor and is not connected to the controller such that a transmission over the controller bypass line is transmitted directly between the transceiver and the processor without being received in or transmitted by the controller.

16. The node device as recited in claim 15, wherein the bus system is a controller area network, or a local interconnect network (LIN) or a FLEXRAY network.

* * * * *